United States Patent
Tripathi et al.

(10) Patent No.: US 9,030,035 B2
(45) Date of Patent: May 12, 2015

(54) QUICK START-UP OF WIND TURBINE GENERATORS

(75) Inventors: Anshuman Tripathi, Singapore (SG); Elvis Yu, Singapore (SG); Yugarajan Karuppanan, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 239 days.

(21) Appl. No.: 13/330,298

(22) Filed: Dec. 19, 2011

(65) Prior Publication Data

US 2013/0154262 A1    Jun. 20, 2013

(51) Int. Cl.
*H02P 9/08* (2006.01)
*F03D 7/02* (2006.01)
*F03D 7/04* (2006.01)

(52) U.S. Cl.
CPC ............. *F03D 7/026* (2013.01); *F03D 7/048* (2013.01); *H02P 2101/15* (2015.01); *Y02E 10/723* (2013.01)

(58) Field of Classification Search
CPC ......... F03D 9/002; Y02E 10/70; Y02E 10/72; Y02E 10/74; Y02E 10/76
USPC .................................................... 290/44, 55
See application file for complete search history.

(56) References Cited

U.S. PATENT DOCUMENTS

| | | | |
|---|---|---|---|
| 8,000,840 B2 | 8/2011 | Nielsen | |
| 2002/0105190 A1* | 8/2002 | Thomas | 290/55 |
| 2007/0108769 A1* | 5/2007 | Wobben | 290/44 |
| 2008/0284172 A1* | 11/2008 | Nielsen | 290/44 |
| 2009/0160187 A1* | 6/2009 | Scholte-Wassink | 290/44 |
| 2009/0206603 A1* | 8/2009 | Llorente Gonzalez | 290/44 |
| 2010/0283252 A1* | 11/2010 | Fradella | 290/55 |
| 2011/0204633 A1* | 8/2011 | Takayanagi | 290/44 |
| 2012/0146423 A1* | 6/2012 | Bodewes et al. | 307/84 |

FOREIGN PATENT DOCUMENTS

| EP | 1961957 A2 | 8/2008 |
|---|---|---|
| EP | 2072813 A2 | 6/2009 |

OTHER PUBLICATIONS

International Search Report and Written Opinion, PCT/DK2012/050469, Mar. 14, 2013.

* cited by examiner

*Primary Examiner* — Pedro J Cuevas
*Assistant Examiner* — Sean Gugger
(74) *Attorney, Agent, or Firm* — Patterson & Sheridan, LLP

(57) ABSTRACT

A wind farm is provided that is capable of quickly starting up without delay after an electrical grid becomes available after an outage. According to one embodiment, the wind farm comprises one or more main WTGs and an auxiliary WTG having a substantially lower start-up energy requirement than the one or more main WTGs. The auxiliary WTG is coupled to supply power to the one or more main WTGs to prepare the one or more main WTGs for start-up.

20 Claims, 3 Drawing Sheets

QUICK START-UP OF WIND TURBINE GENERATORS

FIELD OF THE INVENTION

The present invention relates generally to methods for starting up wind turbine generators (WTGs) in a wind farm, and, in particular, to methods for preparing the WTGs for start-up when power from an electrical grid is unavailable. The present invention also relates generally to wind farms capable of preparing its WTGs for start-up when power from an electrical grid is unavailable.

BACKGROUND OF THE INVENTION

Both wind farms and associated electrical grids suffer faults due to storms, demand fluctuations, and the like. Moreover wind farms and the associated electrical grids require periodic maintenance. Therefore, wind turbine generators (WTGs) in wind farms must frequently start-up (i.e., start supplying power) without any external source of power, such as an electrical grid. However, preparing a WTG to start up typically requires substantial energy. For example, before a WTG can start supplying power, certain start-up procedures are often necessary, such as yawing the WTG upwind, pre-heating certain components, and pre-heating fluids, such as oil and water.

Furthermore, certain WTGs, particularly off-shore WTGs, supply power to an electrical grid through a high voltage DC bus (i.e., DC-connected WTGs). Such DC-connected WTGs typically have a power conversion stage that converts AC power output by a generator in the WTG to DC power that is supplied to the DC bus. A large capacitor in this power conversion stage (i.e., a DC-link capacitor) must be pre-charged before the WTG is able to supply power to the electrical grid. Using power supplied by the electrical grid to pre-charge the DC-link capacitor is often impractical because of the large voltage difference between the DC bus (e.g., about 45 kV to about 66 kV) and the DC-link capacitor voltage (e.g., about 5 kV). Therefore, even when electrical grid power is available for use during start-up, DC-connected WTGs cannot readily use this power to pre-charge their DC-link capacitors.

U.S. Pat. No. 8,000,840 (the '840 patent) describes a method of starting up at least a part of a wind power plant connected to an external grid substantially without any energy delivered from the external grid. The wind power plant has a plurality of wind turbines and at least one power source connected to at least one of the wind turbines in order to start the wind turbine while isolated from the remaining wind turbines. The started wind turbine may then supply power in order to start further wind turbines. According to the '840 patent, the at least one power source used to start the initially started wind turbine could be a small gas turbine, a diesel generator, a battery, or a fuel cell.

However, unlike the wind turbines, some of the power sources identified by the '840 patent are non-renewable and/or harmful to the environment. Therefore, such auxiliary power sources counteract certain environmental benefits that are a primary reason for using wind farms in the first place. Moreover, after an electrical grid outage there is usually some uncertainty as to when the electrical grid will be ready to receive and distribute power supplied by a wind farm. Thus, even if a wind farm, such as that of the '840 patent, is able to start up on its own without power from the electrical grid, if the electrical grid is not available to distribute power that the wind farm generates, preparing the wind farm for start-up will not be cost effective until the electrical grid is available anyway. In addition, because the start-up procedures can last a long time, particularly a pre-heating stage, which can last more than half a day or even up to 24 hours depending on the surrounding temperature, the wind farm will not start supplying power to the electrical grid until well after the electrical grid becomes available to receive and distribute the power. Consequently, the wind farm's power production factor will be undesirably limited.

SUMMARY OF THE INVENTION

According to a first aspect, the invention provides a wind farm capable of quickly starting up without delay after an electrical grid becomes available after an outage. The wind farm comprises one or more main WTGs and an auxiliary WTG having a substantially lower start-up energy requirement than any one of the one or more main WTGs. The auxiliary WTG is coupled to supply power to the one or more main WTGs to prepare the one or more main WTGs for start-up.

In an embodiment of the wind farm according to the first aspect of the invention, the auxiliary WTG is a vertical axis WTG.

In another embodiment of the wind farm according to the first aspect of the invention, at least one of the one or more main WTGs starts up with substantially no delay after power from the external electrical gird becomes available.

In another embodiment of the wind farm according to the first aspect of the invention, at least one of the one or more main WTGs prepares for start-up by using the power supplied by the auxiliary WTG to at least one of: pre-heat at least one of a fluid and a component of each of the one or more main WTGs, and yaw each of the one or more main WTGs upwind.

In another embodiment of the wind farm according to the first aspect of the invention, at least one of the one or more main WTGs is coupled to supply power to start up the auxiliary WTG before power from the external electrical grid becomes unavailable.

In another embodiment of the wind farm according to the first aspect of the invention, the wind farm further includes a fuel cell that supplies power to start up the auxiliary WTG.

In another embodiment of the wind farm according to the first aspect of the invention, the wind farm further includes a high voltage DC bus. In addition, at least one of the one or more main WTGs outputs DC power to the high voltage DC bus.

According to a second aspect, the invention provides a method for quickly starting up one or more wind turbine generators (WTGs) in a wind farm that supplies power to an electrical grid. The method includes, during an electrical grid outage, preparing one or more WTGs in the wind farm for start-up using locally supplied power before the electrical grid is able to receive and distribute power generated by the wind farm. In addition, the method includes starting up at least one of the one or more WTGs with substantially no delay after the electrical grid is able to receive and distribute power generated by the wind farm.

In an embodiment of the method according to the second aspect of the invention, the locally supplied power is supplied by a vertical axis WTG.

In another embodiment of the method according to the second aspect of the invention, preparing the one or more WTGs for start-up includes at least one of: pre-heating at least one of a fluid and a component of each of the one or more main WTGs; and yawing each of the one or more main WTGs upwind.

In another embodiment of the method according to the second aspect of the invention, the method further includes starting up a generator to provide the locally supplied power using power supplied by the wind farm.

In another embodiment of the method according to the second aspect of the invention, the method further includes starting up a generator to provide the locally supplied power using power supplied by a fuel cell.

In another embodiment of the method according to the second aspect of the invention, the method further includes starting up a generator to provide the locally supplied power, the generator that provides the locally supplied power being self-starting.

In another embodiment of the method according to the second aspect of the invention, the method further includes at least one of the one or more WTGs outputting DC power to a high voltage DC bus.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Example methods and systems described herein can be used to prepare a wind farm for start-up using locally supplied power while power from an electrical grid is unavailable. Moreover, the example methods and systems facilitate carrying out start-up preparations before a time of availability of electrical grid power is known, thereby improving a power production factor of the wind farm relative to a wind farm that does not begin preparing for start-up until electrical grid power is available or known to become available within a predetermined period of time. The colder a wind farm's operating environment is, the longer it will take to pre-heat components and/or fluids in the WTGs of the wind farm. Therefore, the ability to begin start-up preparations, such as pre-heating, early is of greatest value in relatively cold environments. However, embodiments of the invention can advantageously be used in warm environments, as well, since WTGs often require additional start-up preparation activities, such as yawing upwind.

Figure 1:
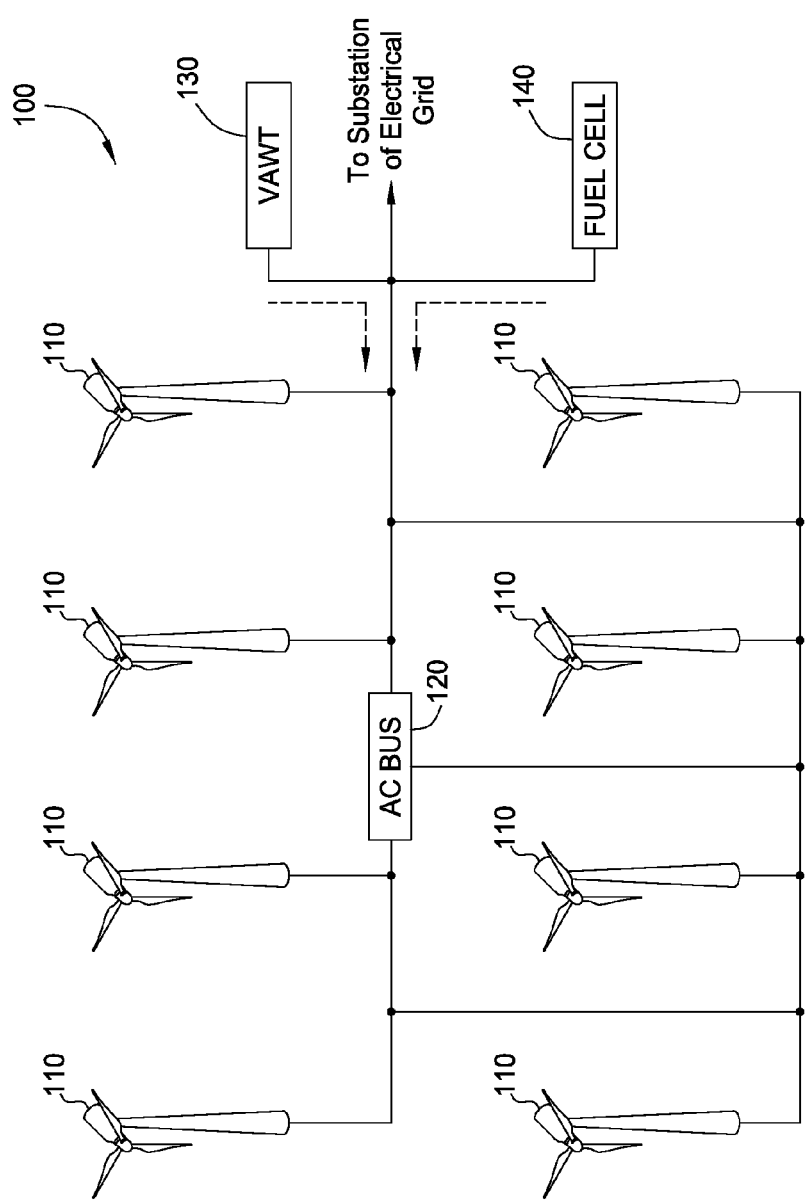
FIG. 1 shows a first example wind farm that can be started up quickly when power from an electrical grid is unavailable.

FIG. 1 illustrates an example wind farm 100 according to an embodiment. As illustrated in FIG. 1, the wind farm 100 includes a plurality of main WTGs 110 connected via an alternating current (AC) bus 120 to a substation of an electrical grid, an auxiliary WTG 130, and an auxiliary fuel cell 140. In the wind farm 100, the auxiliary WTG 130 has a substantially lower start-up energy requirement than the plurality of main WTGs 110. Due at least in part to the relatively small start-up energy requirement of the auxiliary WTG 130, at least some of the main WTGs 110 of the wind farm 100 can be prepared for start-up while power from the electrical grid is unavailable. Moreover, because the auxiliary WTG 130 taps an inexhaustible source of energy (i.e., wind), the wind farm 100 or at least a portion thereof can prepare for start-up at any time without wasting precious fuel.

The electrical grid is a power transmission and/or distribution grid for distributing power from a plurality of electrical power generators to electrical power consumers. The wind farm 100 is just one of many electrical power generators that supply power to the electrical grid. Operation of the electrical grid is typically governed by certain standards to which the electrical power generators must conform including, in some cases, supplying AC power at a specific frequency (e.g., 50 Hz or 60 Hz).

The main WTGs 110 include, in one embodiment, horizontal axis WTGs capable of supplying power over the AC bus 120. The main WTGs 110 may be WTGs of the same size and power rating or may be of different sizes and/or power ratings. In one embodiment, a start-up energy requirement for each of the main WTGs 110 is in a range of about 30 kilowatts to about 80 kilowatts, and may depend at least in part on an ambient temperature. In addition, the start-up energy requirement may depend on how quickly the start-up procedures are carried out. If, for example, multiple systems are pre-heated in parallel, the start-up energy requirements will generally be greater than if each of the multiple systems is pre-heated in series. The type of generator used may also affect start-up energy requirements. For example, a permanent magnet generator generally requires less energy to start-up than an induction generator, all else being equal, since induction generators, unlike permanent magnet generators, must generate reactive power to enable current generation.

The auxiliary WTG 130 provides locally supplied power to the wind farm 100, as opposed to externally supplied power from an electrical grid. Moreover, in contrast to the main WTGs 110, the auxiliary WTG 130 has a smaller start-up energy requirement. For example, in one embodiment, the auxiliary WTG 130 is a vertical axis wind turbine (VAWT) that is self-starting, i.e., having no start-up energy requirement (e.g., a Savonius WTG). In such embodiments, the auxiliary fuel cell 140 may be omitted. In another embodiment, the auxiliary WTG 130 is a vertical axis wind turbine (VAWT) having a relatively small start-up energy requirement on the order of, for example, about 1 to about 5 kilowatts (e.g., a Darrieus WTG). If the auxiliary WTG 130 has a small start-up energy requirement, the auxiliary fuel cell 140 may provide the required start-up energy. Alternatively, power supplied by the main WTGs 110 may be used to start up the auxiliary WTG 130 shortly before or shortly after an electrical grid outage occurs or is expected to occur. Consequently, the auxiliary fuel cell 140 may be omitted from the wind farm 100 or may be included as a contingency source of power for starting up the auxiliary WTG 130. Moreover, in embodiments that include the auxiliary fuel cell 140, the auxiliary fuel cell 140 may aid the auxiliary WTG 130 in providing locally supplied power to the wind farm 100, as represented by the dashed arrows coming from the auxiliary fuel cell 140 and the auxiliary WTG 130 in FIG. 1.

The auxiliary WTG 130 and auxiliary fuel cell 140 are connected to the AC bus 120 and can supply power for start-up procedures to the main WTGs 110 through the AC bus 120 when the electrical grid is not functioning. Moreover, when the electrical grid is functioning again, the auxiliary WTG 130 may be shut down to reduce wear and the auxiliary fuel cell 140 may be shut off to preserve fuel. In embodiment, however, the auxiliary WTG 130 may be configured to provide power to the electrical grid along with the main WTGs 110 when the electrical grid is functioning and to the main WTGs 110 when the electrical grid is not functioning.

Although the wind farm 100 is depicted as having only one auxiliary WTG 130 and only one auxiliary fuel cell 140, the wind farm 100 may instead include multiple auxiliary WTGs 130 and/or multiple auxiliary fuel cells 140. For example, depending on start-up energy requirements of the main WTGs 110 and the supply capabilities of the auxiliary WTG 130, multiple auxiliary WTGs 130 may be needed to prepare a single main WTG 110 for start-up. Correspondingly, multiple auxiliary fuel cells 140 may be needed for each of the multiple auxiliary WTGs 130. In embodiments in which start-up energy requirements are lower, multiple main WTGs 110 may be able to prepare for start-up using the power supplied by a single auxiliary WTG 130. In certain other embodiments, an auxiliary WTG 130 is provided for each main WTG 110. For example, in one embodiment, the wind farm 100 includes only a single main WTG 110, a single auxiliary WTG 130, and a single auxiliary fuel cell 140 (which may be omitted if the auxiliary WTG 130 is self-starting). Furthermore, if the auxiliary WTG 130 supplies sufficient power, multiple start-up preparation procedures for a single main WTG 110 may be carried out in parallel to save time. For example, air, water, gear oil, and/or components, such as a hydraulic power pack, may be pre-heated at the same time. In addition, or alternatively, multiple main WTGs 110 may be prepared for start-up in parallel if enough auxiliary power is available.

In other embodiments, e.g., where the amount of power supplied by the auxiliary WTG 130 is limited, some or all of the start-up preparation procedures may be carried out in series. For example, in one embodiment, a first one of the main WTGs 110 or group of main WTGs 110 is(are) prepared for start-up using power supplied by the auxiliary WTG 130. Then, when the first main WTG (or group of main WTGs) 110 has started up, a second main WTG 110 (or group of main WTGs) is prepared for start-up using power supplied by the first main WTG 110. The start-up sequence may continue in like manner until the entire wind farm 100 has started up. Thus, when starting up the wind farm 100, the auxiliary power supplied by the auxiliary WTG 130 may be used to prepare only a single main WTG (or a group of main WTGs) 110 for start-up and all other main WTGs 110 may be started up using power supplied by the initially started main WTG(s) 110 or a later started main WTG 110. In one embodiment, the initially started main WTG(s) 110 is(are) pre-designated. Alternatively, a pre-designated list of candidates may be used to select the initial main WTG(s) 110. Therefore, if a first one of the candidates is inoperable, another candidate may be selected instead. Candidates in the pre-designated list may be prioritized according to distance from the auxiliary WTG 130 and/or according to some other criteria, such as position in the wind farm 100 relative to other WTGs.

Figure 2:
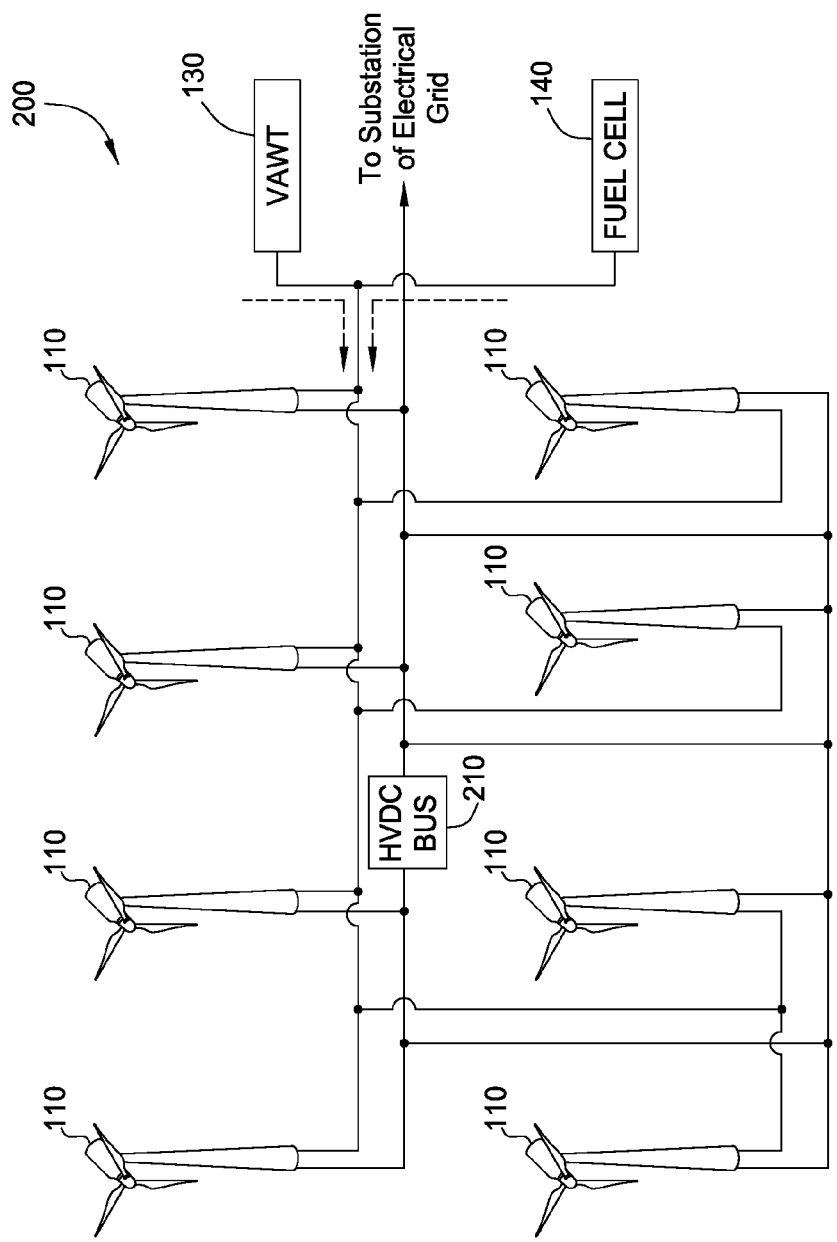
FIG. 2 shows a second example wind farm that can be started up quickly when power from an electrical grid is unavailable.

In an alternative embodiment, a wind farm 200 shown in FIG. 2 uses a DC bus 210 instead of the AC bus 120 of the wind farm 100. To avoid transmission losses, the DC bus 210 may carry a high voltage power signal and, therefore, may be referred to as a high voltage DC (HVDC) bus. For example, the voltage of the power signal may be a value ranging from about 45 kilovolts to about 66 kilovolts. Because the voltage of the power signal carried by the HVDC bus 210 is high, it must be stepped down for start-up preparations at the main WTGs 110. However, stepping the voltage down is impractical due to the large and high cost of designing a step-down transformer that could step down the voltage sufficiently. Therefore, the auxiliary WTG 130 and (optional) auxiliary fuel cell 140 may instead be used to supply power for start-up preparations to the main WTGs 110 in the wind farm 200. Moreover, instead of connecting the auxiliary WTG 130 and auxiliary fuel cell 140 directly to the HVDC bus 210, power is supplied from the auxiliary WTG 130 to the main WTGs 110 via another bus that runs parallel to the HVDC bus 210.

Figure 3:
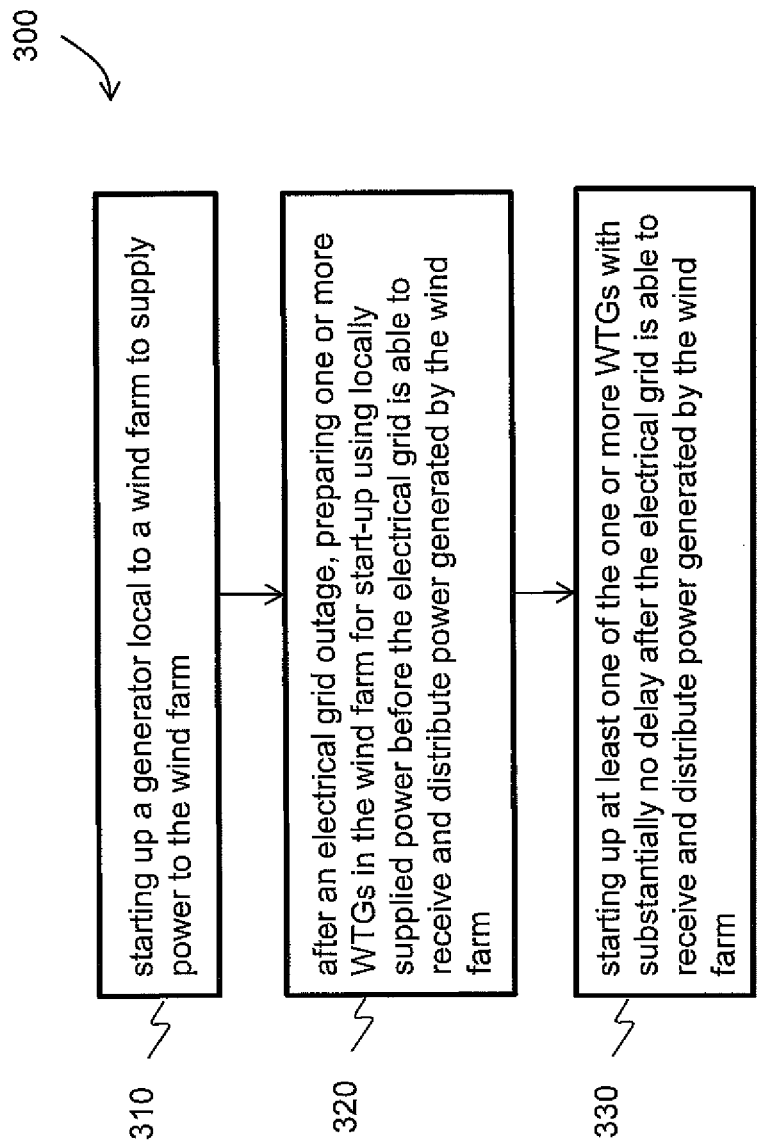
FIG. 3 shows a flow diagram representing an example method for starting up a wind farm quickly when power from an electrical grid is unavailable.

FIG. 3 shows an example method 300 for quickly starting up one or more WTGs, such as the main WTGs 110 of the wind farm 100 or the wind farm 200. The method 300 may be implemented after an electrical grid becomes unavailable, at least for purposes of supplying power to and distributing power from the wind farm. The electrical grid may be unavailable due to a long term fault or shut-down caused, e.g., by storms, major grid faults, or other abnormal conditions. In such conditions, a time of availability of the electrical grid is often unknown.

The method 300 includes a first stage 310 in which a generator local to the wind farm is started up to supply power to the wind farm. The local generator may be the auxiliary WTG 130 of the wind farm 100 or of the wind farm 200. In addition, the local generator may start-up in response to a command from a wind farm controller or automatically in response to detecting a fault or a loss of power on the electrical grid. Moreover, as discussed above, the local generator may be started up using power supplied by the wind farm before power from an external electrical grid becomes unavailable. For example, while the wind farm is gradually shutting down after the electrical grid becomes unavailable, the WTGs may continue to provide some power, which the local generator may use to start up. Alternatively, the local generator may be started up using power supplied by a fuel cell, such as the auxiliary fuel cell 140. As another alternative, the local generator may be self-starting.

After the local generator has started up, one or more WTGs in the wind farm are prepared for start-up at stage 320 using the locally generated power. Preparing the one or more WTGs for start-up may include pre-heating a component of each of the one or more WTGs, pre-heating a fluid in each of the one or more WTGs, yawing each of the one or more WTGs upwind, and/or a combination of the foregoing preparation procedures. The start-up preparations may be advantageously carried out before the electrical grid is able to receive and distribute power generated by the wind farm.

At stage 330, at least one of the one or more WTGs starts up with substantially no delay after power from the electrical grid is able to receive and distribute power generated by the wind farm. Starting up the at least one WTG may include supplying AC power to the AC bus 120 (in case the wind farm is the wind farm 100) or outputting DC power to the HVDC bus 210 (in the case the wind farm is the wind farm 200). The AC power or DC power is provided to a substation of the electrical grid and is distributed from there by the electrical grid to electrical power consumers.

The method 300 is described herein by way of example and not limitation. More specifically, additional stages may be added to the method and/or at least one the stages of the method 300 may be modified or omitted. For example, the start-up preparations may be carried out while power from an electrical grid is available to the one or more WTGs or when a time of availability of electrical grid power is known. However, the method 300 contributes more to increasing a power production factor when implemented while the electrical grid is unavailable and before a time of availability of the electrical grid is known. By doing so, the wind farm, or at least a portion thereof, will be ready to start up with substantially no delay when the electric grid becomes available and can receive and distribute the power generated by the wind farm.

At least some of the stages of the method 300 may be carried out using digital logic circuitry and/or analog circuitry. The circuitry may include, for example, one or more controllers or processors that execute instructions recorded on computer-readable media. The one or more controllers or processors may include a central controller of the wind farm, a controller of the local generator, and/or a controller of the at least one WTG that is started up.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

We claim:

1. A wind farm capable of quick start-up, the wind farm comprising:
   one or more main wind turbine generators (WTGs) configured to supply power to an external electrical grid;
   an auxiliary WTG having a substantially lower start-up energy requirement than any one of the one or more main WTGs; and
   a control arrangement coupled with the one or more main WTGs and the auxiliary WTG, the control arrangement configured to:
      initiate a shutdown process of the wind farm in response to an unavailability of the electrical grid, and
      start up, before power production from at least a first main WTG is ceased as part of the shutdown process, the auxiliary WTG using power supplied directly from the first main WTG to the auxiliary WTG,
   wherein the auxiliary WTG, when started up, is configured to supply power to at least one of the main WTGs to prepare the at least one main WTG to be started up when the electrical grid subsequently becomes available.

2. The wind farm according to claim 1, wherein the auxiliary WTG is a vertical axis WTG.

3. The wind farm according to claim 1, wherein at least one of the one or more main WTGs is configured to start up with substantially no delay after the electrical grid subsequently becomes available.

4. The wind farm according to claim 1, wherein the auxiliary WTG is further configured to supply power to the at least one main WTG to yaw each of the at least one main WTG upwind.

5. The wind farm according to claim 1, further comprising:
   a fuel cell that supplies power to start up the auxiliary WTG.

6. The wind farm according to claim 1, wherein the one or more main WTGs are configured to supply power to the external electrical grid using a high voltage direct current (DC) bus, and the one or more main WTGs are configured to receive power for start-up preparations through a second bus parallel to the high voltage DC bus.

7. The wind farm of claim 1, wherein at least one of the main WTGs is selected to be started up initially, based on a distance from the at least one main WTG to the auxiliary WTG.

8. The wind farm of claim 1, wherein the unavailability of the electrical grid is caused by one of a grid fault and a loss of power on the electrical grid.

9. A method for quick start-up of one or more wind turbine generators (WTGs) in a wind farm configured to supply power to an external electrical grid, the method comprising:
   initiating a shutdown process of the wind farm in response to an unavailability of the electrical grid;
   starting up, before power production from at least a first WTG is ceased as part of the shutdown process, a second WTG using power supplied directly from the first WTG to the second WTG;
   preparing at least one of the one or more WTGs for a subsequent start-up using local power at least partly provided by the started second WTG; and
   starting up the at least one prepared WTG when the electrical grid subsequently becomes available to receive and distribute power supplied by the wind farm.

10. The method according to claim 9, wherein the local power is supplied by a vertical axis WTG.

11. The method according to claim 9, wherein the local power is further used to yaw the at least one prepared WTG upwind.

12. The method according to claim 9, further comprising:
    starting up a generator using power generated by at least one of the WTGs of the wind farm,
    wherein the generator contributes to the local power.

13. The method according to claim 9, further comprising:
    starting up a generator using power generated by a fuel cell,
    wherein the generator contributes to the local power.

14. The method according to claim 9, further comprising:
    starting up a self-starting generator to contribute to the local power.

15. The method according to claim 9,
    wherein the one or more WTGs are configured to supply power to the electrical grid using a high voltage direct current (DC) bus, and the one or more WTGs are configured to receive power for start-up preparations through a second bus parallel to the high voltage DC bus.

16. The method of claim 9, wherein preparing one or more WTGs for start-up further comprises selecting at least one WTG to be started up initially, based on a distance from the at least one WTG and a source of the locally supplied power.

17. The method of claim 9, wherein the at least one prepared WTG is started up with substantially no delay when the electrical grid subsequently becomes available.

18. The method of claim 9, wherein the second WTG has a substantially lower start-up energy requirement than any of the at least one WTG prepared for subsequent start-up.

19. A method for operating one or more main wind turbine generators (WTGs) in a wind farm coupled to an external electrical grid, the method comprising:
    starting up, during a shutdown process of the wind farm and before power production from at least a first main WTG is ceased as part of the shutdown process, an auxiliary WTG using power supplied directly from the first main WTG to the auxiliary WTG, wherein the auxiliary WTG, when started up, is configured to supply power to at least one of the main WTGs to prepare the at least one main WTG for a subsequent start-up.

20. The method of claim 19, wherein the at least one prepared main WTG is immediately available for subsequent start-up when the external electrical grid becomes available to receive and distribute power.

* * * * *